United States Patent [19]

Ferrando et al.

[11] Patent Number: 4,978,054

[45] Date of Patent: Dec. 18, 1990

[54] DIFFUSION BONDING PROCESS FOR ALUMINUM AND ALUMINUM ALLOYS

[75] Inventors: William A. Ferrando, Arlington; Amarnath P. Divecha, Falls Church; Subhash D. Karmarkar, Great Falls, all of Va.

[73] Assignee: The United States of America as represented by the Secretary of the Navy, Washington, D.C.

[21] Appl. No.: 548,331

[22] Filed: Jul. 3, 1990

[51] Int. Cl.$^5$ .......................... B23K 1/20; B23K 20/00; B23K 101/02; B23K 103/16
[52] U.S. Cl. ..................................... 228/194; 228/120; 228/124; 228/265; 228/209; 228/234; 228/263.12; 228/263.17
[58] Field of Search ............... 228/120, 122, 124, 155, 228/265, 903, 193, 194, 208, 209, 211, 234, 263.12, 263.17

[56] References Cited

U.S. PATENT DOCUMENTS 4,650,108  3/1987  Gallagher ........................... 228/209

FOREIGN PATENT DOCUMENTS 0121209 10/1984  European Pat. Off. ............ 228/194
0229954  7/1987  European Pat. Off. ............ 228/194
   6153  1/1976  Japan .................................. 228/209
 619279  3/1949  United Kingdom ................ 228/209

*Primary Examiner*—Heinrich Sam
*Attorney, Agent, or Firm*—Kenneth E. Walden; Roger D. Johnson

[57] ABSTRACT

A method of forming diffusion bonds between aluminum and aluminum alloy surfaces by coating the surfaces with molten $AgNO_3$ and then decomposing the $AgNO_3$ to form a thin uniform layer of silver on the surfaces before forming the diffusion bond. The $AgNO_3$ coating and decomposition in treatment permanently breaks up the $Al_2O_3$ coatings on the aluminum or aluminum alloy surfaces, making diffusion bonding possible.

27 Claims, No Drawings

DIFFUSION BONDING PROCESS FOR ALUMINUM AND ALUMINUM ALLOYS

BACKGROUND OF THE INVENTION

This invention relates to metallurgy and more particularly to the diffusion bonding of metals.

Surfaces of all aluminum alloys are characterized by a very thin, adherent, and continuous coating of aluminum oxide ($Al_2O_3$). In fact, it is this coating or film which gives Al and its alloys the excellent properties such as oxidation resistance, corrosion resistance and stability which most steels do not possess. Another unusual characteristic of Al alloys is that the film forms immediately, even in hard vacuum. In air, the film also forms immediately, grows to 100-500 angstroms and remains stable. It is for this reason that welding and soldering of Al alloys is considerably more difficult than steels and copper and nickel base alloys. Soldering of Al alloys can be accomplished only when the oxide is directly displaced during the process. In welding, the oxide film must disturbed by brushing just prior to passing the inert gas enveloped electric arc to form a good joint. Even when Al is in molten condition, the film will stay on the top of the surface and prevent runaway oxidation.

Thus, the presence of the surface oxide on Al, while very advantageous for many purposes, is a significant barrier to joining, particularly in the solid state. In contrast, titanium alloys, notably, superplastic Ti-6Al-4V can be joined in the solid state at approximately 900° C under pressures of 600-1000 psi. Very complex shapes can be formed by this method without the necessity of welding or riveting Many Al alloys are also superplastically formable, but are not bondable in the solid state. The primary attribute of Ti alloys is that the oxide of titanium ($TiO_2$) is soluble in metallic Ti. Therefore, when two sheets of superplastically deformable Ti-6Al-4V are processed, they are metallurgically bonded together nearly perfectly. The oxide of Ti on the surface is actually dissolved in the alloy to create a fresh metallic Ti leading to a sound bond between the two mating surfaces On the other hand, Al does not behave in the same manner because its oxide tenaciously remains on the surface. Superplastic forming and diffusion bonding (called SPFDB) is possible in the case of Ti alloys while Al alloys need surface modification to remove or disturb the $Al_2O_3$ film. Numerous efforts to achieve SPFDB of Al alloys can be cited but success has been elusive.

There is an urgent need to develop processes which enable diffusion bonding of superplastically formable Al alloys because the need for rivets would be reduced or eliminated. This would result in the improvement of performance and safety of military and commercial aircraft. Performance would be improved by the reduction in weight of structures; safety would be the result of increased fatigue life. This has been demonstrated by the use of superplastic forming and diffusion bonding of titanium structures and parts in military aircraft, including the F14 and F16. Application of superplastic forming and diffusion bonding to aluminum alloys is bound to be even more useful than that of titanium alloys because approximately 30 to 50 percent of the modern military and commercial aircraft are composed of aluminum based materials.

For other applications it would be desirable to provide a procedure for the simple diffusion bonding of aluminum or aluminum alloy pieces together It would also be desirable to provide a method for diffusion bonding graphite/aluminum metal matrix composite pieces together.

SUMMARY OF THE INVENTION

Accordingly, an object of this invention is to provide a method of joining aluminum or aluminum alloy pieces together by diffusion bonding.

Another object of this invention is to provide a superplastic forming and diffusion bonding process for superplastic aluminum alloys.

A further object of this invention is to provide a method of joining graphite/aluminum metal matrix composite pieces together by diffusion bonding.

These and other objects of this invention are accomplished by providing:

A method of forming diffusion bonds between metal surfaces where the metals may be the same or different and are each aluminum or an aluminum alloy by coating the metal surfaces with molten $AgNO_3$ and then decomposing the $AgNO_3$ to form a thin uniform layer of silver on the metal surfaces before forming the diffusion bond. The $AgNO_3$ coating and decomposition treatment permanently breaks up the $Al_2O_3$ coatings on the metal surfaces making diffusion bonding possible.

DETAILED DESCRIPTION OF THE PREFERRED EMBODIMENT

The process of this invention is used to form diffusion bonds between surfaces of aluminum or aluminum alloys. The aluminum alloys preferably contain from 75 to less than 100, and still more preferably from 85 to less than 100 weight percent of aluminum. Of specific interest is the use of this process with superplastically deformable aluminum alloys in combined superplastic forming and diffusion bonding (SPFDB) processes.

In the first step, the aluminum or aluminum alloy surfaces to be bonded are coated with molten $AgNO_3$ at a temperature above the melting point of $AgNO_3$ (mp 212° C.) but below the decomposition temperature of $AgNO_3$ (dec 444° C.). Note that the aluminum or aluminum alloy pieces being bonded are also heated at this temperature to prevent the molten $AgNO_3$ from freezing during the coating process. Again, the molten $AgNO_3$ coating is applied to those surfaces on the aluminum or aluminum alloy pieces which are to be diffusion bonded together. The molten $AgNO_3$ coating can be applied by dipping, immersion, painting, rolling on, spraying or other common commercial methods of applying liquid coatings. The molten $AgNO_3$ readily wets the aluminum or aluminum alloy surfaces, forming a thin uniform coating.

The molten $AgNO_3$ coated aluminum or aluminum alloy pieces are heated at a temperature of preferably from above the decomposition temperature of $AgNO_3$ to 525° C., and more preferably from 450 to 470° C. to decompose the $AgNO_3$ to form silver metal. The chemical reactions of this decomposition are

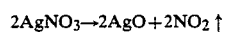

$$2AgNO_3 \rightarrow 2AgO + 2NO_2 \uparrow$$

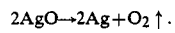

$$2AgO \rightarrow 2Ag + O_2 \uparrow.$$

The thin layer of silver metal covers those surfaces of the aluminum or aluminum alloy pieces which are to be diffusion bonded together.

The silver coated surfaces to be bonded are then placed together and held in contact. As an alternative, these surfaces can be placed together and held in contact prior to the decomposition of the molten $AgNO_3$ coating. The surfaces would then be held together during the decomposition of $AgNO_3$ to silver metal.

Whichever sequence of steps is used, at this point the silver metal coated surfaces to be diffusion bonded are being held together. The temperature of the aluminum or aluminum alloy pieces is raised to a temperature in the preferably from 475 to 525° C. and more preferably from 490 to 510° C. for a time sufficient to form the desired diffusion bonds. This will generally be from about 0.5 to 2 hours. The silver nitrate apparently disturbs the aluminum oxide coatings on the aluminum and aluminum alloy surfaces and thus permits the diffusion of fresh, oxide-free aluminum to form the bonds. The pressure which is applied to the aluminum or aluminum alloy pieces during the diffusion bonding may be just enough to hold the surfaces together or it may be as much as 15,000 psi or more. The examples demonstrate that the process works well at 11,000 psi. For superplastic forming and diffusion bonding (SPFDB) processes the pressure is preferably from 5,000 to 15,000, or more preferably from 10,000 to 15,000, or still more preferably from 10,000 to 12,000 psi. Moreover by using a diffusion bonding pressure of preferably from about 10,000 to 15,000 or more preferably from 10,000 to 12,000 psi, the diffusion bonding temperature may preferably be in range of from 400° C. to less than 475° C. or more preferably from 425 to 470° C.

Metal matrix composites in which aluminum or an aluminum alloy is the matrix metal are commonly clad in sheets of aluminum or an aluminum alloy. These composites comprise a reinforcing material such as a ceramic such as boron nitride, silicon carbide, or more preferably a graphite or a high modulus carbon material in addition to the metal matrix. The reinforcing material may be in the form of fibers or a weave of fibers or particulates or short fibers of SiC, C, $B_4C$ etc. Because the cladding sheets are made of solid aluminum or aluminum alloy, the above described molten $AgNO_3$ coating, $AgNO_3$ decomposition, and diffusion bonding steps may be used to form diffusion bonds between cladded metal matrix composite pieces or between a cladded metal matrix composite piece and a solid piece of aluminum or aluminum alloy. The only change in procedure is that high pressures which would damage a metal matrix composite piece can not be used.

As stated before, methods superplastic forming and diffusion bonding (SPFDB) of superplastically deformable titanium alloys (e.g., Ti-6Al-4V) are well known in the aircraft industry. Equipment for SPFDB processing is also available. Very complex shapes can be formed by the SPFDB process without the use of welds or rivets. Superplastically deformable aluminum alloys (e.g., AL 7475 available from Alcoa) are well known and have been used in sheets and plates with molds to form very complex shapes. However, diffusion bonding has not been available and rivets have been needed. With the method of the present invention, the SPFDB process can now be adapted to superplastically deformable aluminum alloys.

In the SPFDB process for aluminum alloys, two sheets of superplastically deformable aluminum alloy are coated with molten $AgNO_3$ on those parts or areas of the surfaces that are to form the diffusion bonds. The aluminum alloy sheets will be at a temperature above the melting point of $AgNO_3$ but below the decomposition temperature of $AgNO_3$. The molten $AgNO_3$ is then decomposed at a temperature of preferably from above the decomposition temperature of $AgNO_3$ to 525° C. or more preferably from 450 to 470° C. The $AgNO_3$ decomposes to form a thin layer of silver over those parts or areas of the surfaces which are to form the diffusion bonds. The two sheets of superplastically deformable aluminum are placed into contact silvered face to silvered face so that the area which are to form the diffusion bonds coincide The aluminum alloy sheets are then fed into the mold and a pressure of from preferably from 5,000 to 15,000 and more preferably from 10,000 to 12,000 psi is applied to just those areas of the aluminum sheets that are to form the diffusion bonds. The mold and sheets are heated to a temperature at which the aluminum alloy sheets become superplastically deformable. High pressured compressed gas is injected between the aluminum alloy sheets causing those portions or areas not under pressure to deform outward and fill the contours of the mold. The resulting shaped form is then heated at a temperature of preferably 475 to 525° C. or more preferably 490 to 510° C., with the pressure maintained on the diffusion bond areas, until the diffusion bonding is complete. As demonstrated by the examples, very strong diffusion bonds are produced under these conditions. And the bond strength can be further improved by further heat treatment/quenching schedules.

The general nature of the invention having been set forth, the following examples are presented as specific illustrations thereof. It will be understood that the invention is not limited to these specific examples but is susceptible to various modifications that will be recognized by one of ordinary skill in the art.

Four cylinders of 1" diameter 7475 aluminum alloy were machined to fine grit ground end surfaces. $AgNO_3$ was heated to liquid state in a beaker. The end of a cylinder was polished with a fine grit paper, immediately immersed in the liquid $AgNO_3$ and held submerged until wetted by the liquid as the cylinder warmed. This was repeated for three cylinders. The cylinders were transferred to a furnace and heated to about 460° C. for several minutes to decompose the $AgNO_3$. Two of the cylinders were placed, silvered ends together, in a hot press and held at ~1100 psi and 500° C. for 60 minutes, forming a butt joint. The third silvered cylinder was placed against the unsilvered cylinder, after the end of the latter had been polished and sprayed with an oxidation retardant coating, and pressed together under the same conditions. The spray coating was of a type which burns away leaving no residue.

Two ¼" diameter rods were machined from each joined cylinder pair. Another small rod was machined from the remainder for metallographic examination. The rods were further machined for tensile testing. The machining process failed to dislodge the joint, giving a rough initial indication of high bond strength. The small rod was polished flat along its axis perpendicular to the joint and photographed with a metallographic microscope. The photograph showed a rather sharp, uniform bond region for the sample.

The two pairs of rods containing the diffusion bonded interface were further machined to dimensions required for tensile testing. The dimensions required favor tensile testing. The four samples were pulled on an Instron tensile testing machine. The measured breaking force and calculated bond strengths for the four test rods are given in Table 1.

TABLE 1

BONDING STRENGTH

| Sample | Breaking Force | Strength Ultimate Tensile |
|---|---|---|
| | | (ksi = $10^3$ lb./in$^2$) |
| #1 Dual Ag Coatings | 301 lbs. | 24.72 ksi |
| #2 Dual Ag Coatings | 309 lbs. | 25.38 ksi |
| #3 Single Ag Coating | 214 lbs. | 17.56 ksi |
| #4 Single Ag Coating | 231 lbs. | 18.95 ksi |

These strengths are very high in view of the fact that this test represents a first trial of the process. A strength of 25 ksi is about ⅓ that of the bulk heat treated Al 7475-T6. Annealed, soft 7075 is much weaker. Therefore, metallurgical experience suggests that a further heat treatment/quenching schedule could bring the bond strength essentially to that of the bulk material.

Numerous other modifications and variations of the present invention are possible in light of the foregoing teachings. It is therefore to be understood that within the scope of the appended claims the invention may be practiced otherwise than as specifically described.

What is claimed is:

1. A method of diffusion bonding metal pieces together comprising:
    (1) coating the surface of a first metal piece and the surface of a second metal piece which are to be bonded together with molten AgNO$_3$ at a temperature above the melting point of AgNO$_3$ but below the decomposition temperature of AgNO$_3$, wherein metals of the first and second metal pieces are the same or different and are selected from the group consisting of aluminum and aluminum alloys;
    (2) decomposing the molten AgNO$_3$ at a temperature of from the decomposition temperature of silver nitrate up to 525° C. to form a thin, uniform coating of silver metal on the metal surfaces to be bonded;
    (3) placing the silver metal coated metal surfaces to be bonded into contact with each other; and
    (4) heating the metal pieces at a temperature of from 475 to 525° C. until the diffusion bond is formed.

2. The process of claim 1 wherein the order of steps (2) and (3) are reversed so that the AgNO$_2$ coated metal surfaces to be bonded are in contact while the AgNO$_3$ is decomposed.

3. The process of claim 1 wherein the temperatures used to decompose AgNO$_3$ is from 450 to 470° C.

4. The process of claim 1 wherein the temperature used to form the diffusion bond in step (4) is from 490 to 510° C.

5. The process of claim 1 wherein the aluminum alloys contain from 75 to less than 100 weight percent aluminum.

6. The process of claim 5 wherein the aluminum alloys contain from 85 to less than 100 weight percent of aluminum.

7. The process of claim 1 wherein the metals of the first and second pieces are selected from the group consisting of superplastically deformable aluminum alloys.

8. The process of claim 7 wherein the superplastically deformable aluminum alloy pieces are superplastically formed and diffusion bonded together at the same time.

9. The process of claim 1 wherein the diffusion bond is formed in step (4) under a pressure of from 5,000 to 15,000 psi.

10. The process of claim 9 wherein the diffusion bond is formed under a pressure of from 10,000 to 15,000 psi.

11. The process of claim 10 wherein the diffusion bond is formed under a pressure of from 10,000 to 12,000 psi.

12. The process of claim 1 wherein the diffusion bond is formed in step (4) under a pressure of from 10,000 to 15,000 psi and at a temperature of from 400 to less than 475° C.

13. The process of claim 12 wherein the diffusion bond is formed under a pressure of from 10,000 to 12,000 psi.

14. The process of claim 12 wherein the diffusion bond is formed at a temperature of from 425° C. to 470° C.

15. The process of claim 14 wherein the diffusion bond is formed under a pressure of from 10,000 to 12,000 psi.

16. A method of diffusion bonding metal clad graphite/metal matrix composite pieces together comprising;
    (1) coating the surface of the metal cladding of a first metal matrix composite piece and the surface of the metal cladding of a second metal matrix composite piece which are to be bonded together with molten AgNO$_3$ at a temperature above the melting point of AgNO$_3$ but below the decomposition temperature AgNO$_3$, wherein the metal of the cladding of the first composite piece, the metal of the cladding of the second composite piece may be the same or different and are selected from the group consisting of aluminum and aluminum alloys, and wherein the metals of the metal matrices of the first and the second metal matrix composite pieces may be the same or different and are selected from the group consisting of aluminum and aluminum alloys;
    (2) decomposing the molten AgNO$_3$ at a temperature of from the decomposition temperature of AgNO$_3$ up to 525° C. to form a thin, uniform coating of silver metal on the metal surfaces to be bonded;
    (3) placing the silver metal coated metal surfaces to be bonded into contact with each other; and
    (4) heating the metal matrix composite pieces at a temperature of from 475° C. to 525° C. until a diffusion bond is formed between the cladding surfaces of the metal matrix composite pieces.

17. The process of claim 16 wherein the order of steps (2) and (3) are reversed so that the AgNO$_3$ coated metal surfaces to be bonded are in contact while the AgNO$_3$ is decomposed.

18. The process of claim 16 wherein the temperature used to decompose AgNO$_3$ is from 450 to 470° C.

19. The process of claim 16 wherein the temperature used to form the diffusion bond in step (4) is from 490 to 510° C.

20. The process of claim 16 wherein the aluminum alloys contain from 75 to less than 100 weight percent of aluminum.

21. The process of claim 20 wherein the aluminum alloys contain from 85 to less than 100 weight percent of aluminum.

22. A method of diffusion bonding a solid metal piece to a metal clad graphite/metal matrix composite piece comprising:

(1) coating the surface of the solid metal piece and the surface of the metal cladding of the metal matrix composite piece which are to be bonded together with molten $AgNO_3$ at a temperature above the melting point of $AgNO_3$ but below the decomposition temperature of $AgNO_3$, wherein the metal of the solid metal piece, the metal of the metal cladding of the composite piece, and the metal of the metal matrix of the composite piece are the same or different and are selected from the group consisting of aluminum and aluminum alloys;

(2) decomposing the molten $AgNO_3$ at a temperature of from the decomposition temperature of $AgNO_3$ to 525° C. to form a thin, uniform coating of silver metal on the metal surfaces to be bonded;

(3) placing the silver metal coated metal surfaces to be bonded into contact with each other; and (4) heating the solid metal piece and the metal matrix composite piece at a temperature of from 475 to 525° C. until a diffusion bond is formed between the surface of the solid metal piece and the surface of the cladding of the metal matrix composite piece.

23. The process of claim 22 wherein the order of steps (2) and (3) are reversed so that the $AgNO_3$ coated metal surfaces to be bonded are in contact while the $AgNO_3$ is decomposed.

24. The process of claim 22 wherein the temperature used to decompose the $AgNO_3$ is from 450 to 470° C.

25. The process of claim 22 wherein the temperature used to form the diffusion bond in step (4) is from 490 to 510° C.

26. The process of claim 22 wherein the aluminum alloys contain from 75 to less than 100 weight percent of aluminum.

27. The process of claim 26 wherein the aluminum alloys contain from 85 to less than 100 weight percent of aluminum.

* * * * *